Oct. 2, 1951     H. E. BUCKLEN III., ET AL     2,570,095
MERCURY SWITCH AND RELAY
Filed Jan. 22, 1948
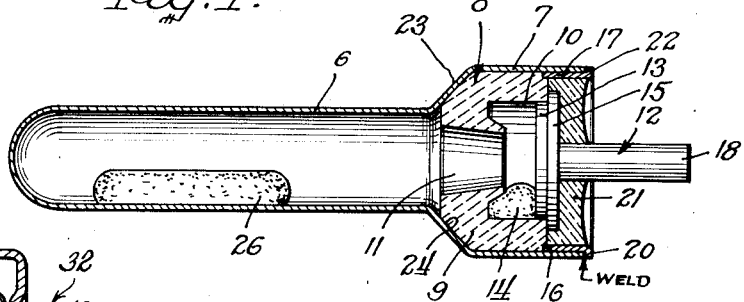
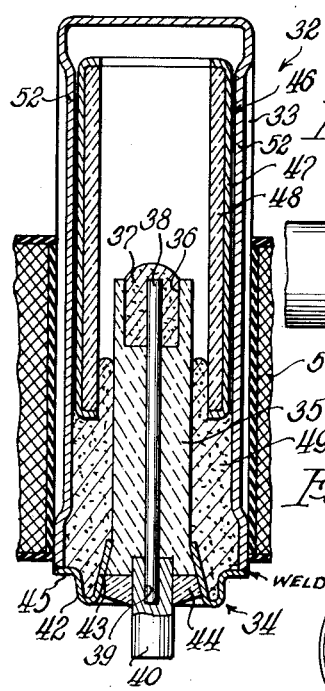
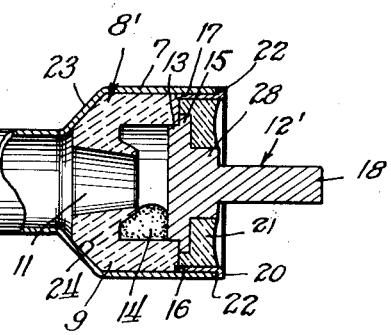
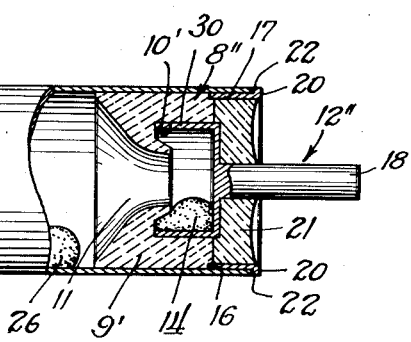
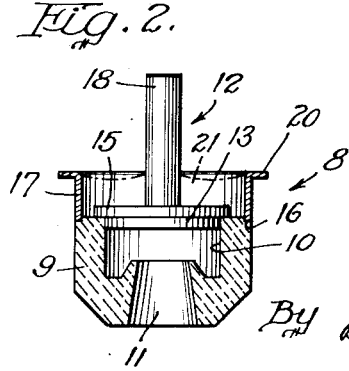
Inventors:
Herbert E. Bucklen, III,
Glen L. Weimer.
By Brown, Jackson, Boettcher & Dienner.
Attys.

Patented Oct. 2, 1951

2,570,095

UNITED STATES PATENT OFFICE 2,570,095

MERCURY SWITCH AND RELAY

Herbert E. Bucklen, III, and Glen L. Weimer, Elkhart, Ind., assignors to Durakool, Inc., Elkhart, Ind., a corporation of Indiana Application January 22, 1948, Serial No. 3,704

10 Claims. (Cl. 200—152)

Our present invention relates to improvements in mercury switches and relays, and electrode assemblies therefor.

It is an object of our invention to provide a mercury switch or relay preferably of the type having a metal shell serving as one electrode for the switch or relay in which a novel electrode assembly including a second electrode for the switch or relay is mounted.

A further object of our invention is to provide an electrode assembly comprising an electrode, a ceramic or insulator member for retaining a body of mercury in contact with the electrode, and a metal sleeve with the aforementioned parts being maintained in assembled relation and with the electrode insulated from the sleeve by a fused seal of insulating material.

A further object is to provide an electrode assembly as aforesaid in which the several elements thereof namely, the electrode, the ceramic member, the metal sleeve, and the fused seal are of compositions having substantially matching coefficients of expansion to prevent breaking away of the several parts from each other over the range of temperatures to which they may be subjected in the operation of the switch or relay.

A further object is to provide a switch or relay having a metal shell forming an electrode and open at one end in which an electrode assembly comprising a second electrode for the switch or relay is mounted in insulated relation in a metal sleeve, with the electrode assembly being mounted in the open end of a metal shell by welding of the sleeve to the shell.

In order to achieve the aforesaid objects we propose to provide a metal shell serving as one electrode for the switch or relay and open at one end, and in which open end an electrode assembly including a second electrode for the switch or relay is mounted. The electrode assembly is formed by arranging the electrode, the metal sleeve, and the ceramic member appropriately with respect to each other and then securing the several parts in permanent assembled relation by pouring molten glass or other suitable insulating material into the metal sleeve which fuses with the ceramic, the electrode and the sleeve. After the electrode assembly has been thus formed it is ready for mounting in the open end of the metal shell.

A preferred feature of our invention is to provide the metal sleeve of the electrode assembly with an outer annular flange which may be conveniently welded to the periphery of the metal shell at the open end thereof to provide for mounting of the electrode assembly in the shell.

By providing the metal sleeve with an annular flange in the manner aforesaid the electrode assembly may be easily mounted as an integral unit in the open end of the metal shell for the switch or relay without resorting to as has been the practice in the prior art of forming the metal shell of two diameters to provide a shoulder or stop so that the several parts of an electrode assembly may be individually disposed in the open end of the switch or relay and thereafter secured therein as by turning in of the open end of the shell.

By providing the electrode assembly as a separate integral unit the steps of evacuating, and, if desired, of thereafter filling the metal shell with gas as is the present practice in this art may be more readily accomplished as will appear in greater detail hereinafter.

We have discovered that the resistance and capacity characteristics of a mercury switch comprising a metal shell which may serve as one electrode for the switch or relay, and in which a second electrode for the switch or relay is mounted in insulated relation, may be greatly improved by providing the surfaces of the shell and electrode with a nickel coating or by using nickel parts.

By nickel plating or otherwise providing the surfaces of these members with which the mercury may come into contact with a nickel coating or by making the parts of nickel we have found that the temperature rise in the switch is considerably reduced over a switch comparably constructed but in which the parts are not nickel coated or made of nickel. Such reduction by use of nickel coating or nickel parts results in being able to carry greater loads without damage to the switch. In addition to such striking improvements in the aforesaid characteristics it has also been found that the nickel coating or nickel parts substantially eliminate contamination of the mercury, and further prevent burning through of the mercury in the case of nickel coated parts to the steel of the shell and the electrode mounted therein. Also, nickel coating the external surfaces of the metal parts or forming the parts of nickel serves to protect these parts against rust.

It is a further object of our invention therefore to provide a mercury switch comprising a metal shell having an electrode mounted in insulated relation and in which the shell and electrode are coated with nickel or are made of nickel.

The above and other objects and advantages of our invention will appear in detailed description.

Now in order to acquaint those skilled in the art with the manner of construction and utilizing mercury switches and relays in accordance with our invention we shall describe in connection with the accompanying drawings certain preferred embodiments of our invention.

In the drawings:

Figure 1 is a longitudinal sectional view through a mercury to mercury switch constructed in accordance with our present invention;

Figure 2 is a detail view showing the manner in which certain of the parts of the electrode assembly of the switch of Figure 1 are positioned for securing these parts of the electrode assembly together by a fused insulating seal;

Figure 3 is a view partly in section and partly in elevation of a switch of our invention showing a modified form of electrode assembly construction;

Figure 4 is a longitudinal sectional view of another form of switch embodying our invention; and Figure 5 is a vertical sectional view of a mercury relay embodying our invention.

Referring now to Figure 1 the switch therein shown is of the mercury to mercury contact type and comprises a tubular metal shell 6 having an enlarged opened end portion 7. An electrode assembly generally indicated at 8, shown in detail in Figure 2, comprises a ceramic insulator member 9 provided with a bore 10 extending inwardly of one end thereof and connecting with a frusto-conical bore 11 extending inwardly from the opposite end thereof. An electrode 12 is formed at one end with a disc portion 13 which is adapted to snugly fit within the bore 10 and to define therewith an annular recess for containing a body of mercury 14. The electrode member 12 adjacent the disc or plate portion 13 thereof is formed with an integral flange or disc portion 15 forming a shoulder for seating against the adjacent end face of the ceramic insulator 9 about the bore 10. The ceramic insulator at the periphery of the end thereof from which the bore 10 extends is provided with an annular shoulder 16 about which one end of a metal sleeve 17 is seated. The electrode 12 further comprises a shank or stem portion 18 which extends coaxially and in spaced relation of the sleeve 17. In order to secure the ceramic insulator member 9 the electrode 12 and the sleeve 17 together to form an integral assembly thereof the ceramic member 9 is seated on its end face from which the frusto-conical bore 11 opens as shown in Figure 2. The electrode is then positioned upon the ceramic insulator with the disc or plate like portion 13 thereof disposed within the bore 10 of the ceramic insulator 9 and the sleeve 17 is mounted at one end on the ceramic insulator 9 about the shoulder 16 thereof. Wtih the parts in this position fused insulating material such as glass is poured into sleeve 17 forming a seal 21 which fuses to the interior cylindrical surface of the sleeve 17, the exposed surface of the flange or disc portion 15 of the electrode 17 and a portion of the stem of the latter, and to the annular portion of the end face of the ceramic insulator 9 between the periphery of the disc portion 14 of the electrode 12 and the inner cylindrical surface of the sleeve 17 whereby the several parts are all united in an integral assembly. Upon completion of the assembly it is adapted to be mounted in the enlarged open end 7 of the metal shell 6, and is secured in fluid tight relation thereto by welding of the annular flange 20 of sleeve 17 to the periphery of the end edge 22 of the enlarged portion 7 at the shell 6. In the form of switch shown in Figure 1 the metal shell 6 between the reduced cylindrical extension thereof and the enlarged end portion 7 thereof is provided with a frusto-conical portion 23 with the adjacent portion of the ceramic insulator 9 as at 24 being correspondingly shaped. The metal shell is adapted to contain a body of mercury shown at 26 so that upon tilting of the switch the body of mercury has access through the frusto-conical bore 11 of the ceramic member to the body of mercury shown at 14 to complete a circuit between the shell 6 and the electrode 12. It will be observed that in the above described construction of the electrode assembly 8 that the insulating composition such as the glass seal 21 for retaining the several parts of the electrode assembly in assembled relation also serves to insulate the electrode 12 from the shell 17.

The switch shown in Figure 3 is the same as that described in connection with Figures 1 and 2 and differs therefrom only in that the electrode assembly 18' comprises an electrode 12' having an additional step portion shown at 28. The parts of the switch shown in Figure 3 bearing the same reference numerals as the switch shown in Figures 1 and 2 are the same as the parts above described in connection with the latter figures.

In the form of switch shown in Figure 4 the construction is substantially similar to that already described except that in this form of the invention the electrode assembly 18'' comprises an electrode member 12'' having a cup-shaped portion 30 which is adapted to be disposed in the bore 10' of the ceramic insulator 9'. Also it will be seen that the metal shell 6' for the switch is of substantially uniform diameter throughout its entire length within this construction of the switch the flange 20 of sleeve 17 also providing for the positioning of the electrode assembly in the open end of tubular metal shell 6'. In this form of the invention the cup-shaped portion 30 may be formed as a separate member and welded to the adjacent end of stem 18. If a separate cap member is used it preferably is made of nickel since if made of this metal it retains a full cup of mercury which apparently is not true even if the cup is made of steel coated with nickel.

Referring now to Figure 5, we have shown a relay 32 constructed in accordance with our present invention which comprises a metal tube or shell 33 closed at its upper end and in the lower open end of which an electrode assembly, indicated generally at 34, is mounted. The electrode assembly 34 comprises a ceramic insulator member 35 having a pocket or recess 36 at its upper end for supporting a body of mercury 37 in contact with the upper end portion of an electrode member 38 extending upwardly through the ceramic member 35. The electrode member 35 at its lower end is secured in a bore 39 of an electrode member 40 with the members 35 and 40 forming one electrode for the relay. A metal sleeve 42 serves to mount the electrode assembly 34 in the relay casing or shell 33 and is provided with a frusto-conical portion 42 to which the peripheral surface of the adjacent end of the ceramic member 35 conforms. The sleeve 42, the electrode member 40, and the ceramic member 35 are secured in assembled relation by a seal 44 of fused insulating material such as glass. The sleeve 42 is further provided with an annular flange 45 which as illustrated is welded about its peripheral edge to the adjacent edge of the open end of the tube or shell 33 to support the electrode assembly 34 in the position shown. A plunger indicated generally at 46 comprises a tubular magnetic metal member 47 having an internal ceramic lining 48. The plunger 46 normally tends to float in the main body of mercury 49 in the lower end of the tube or shell in the position shown in the drawing. A coil 50 surrounds the lower end portion of the tube or shell 33 and this coil when energized is adapted to attract the plunger 46 and move the same downwardly in the tube or shell 33 to displace the main body of mercury 49 into engagement with the body of mercury 37 in the pocket or recess 36 of the ceramic member to complete a circuit between the tube or shell 35 with the electrode formed by electrode members 38 and 40 of the electrode assembly 34. Upon de-energization of coil 50 the plunger due to the buoyancy of the main body of mercury 49 returns to its normal floating position separating the two bodies of mercury and opening the circuit between the tube or shell 33 and the electrode formed by the electrode members 38 and 40. The relay described is of the type known as a fast make fast break relay and it will be understood that our invention had application to other forms of relays. It will also be understood that suitable leads may be connected in any conventional known manner to the tube or shell 33 forming one electrode for the relay, and to the electrode member 50 forming with electrode member 38 the other electrode for the relay. Also the tube or shell 33 as shown is provided with a plurality of internally disposed lengthwise extending ribs 52 for guiding the vertical movement of the plunger within the tube or shell.

In all forms of the switches shown in Figures 1 through 4, the tubular shell 6 and 6', and the several forms of electrode assemblies for the switches after completion thereof and prior to mounting of the same in the metal shells are preferably barrel tumbled in any suitable known nickel plating bath, as for example, compositions of various known combinations of nickel chloride, nickel cyanide, and nickel ammonium sulphate. By so treating the parts of the switches and relay prior to assembly in a nickel bath, all exposed surfaces of the tubes or shells and the exposed surfaces of the electrodes of the several electrode assemblies are provided with a coating of nickel. It will be understood, of course, that the parts may be nickel coated in any other known way, as desired, or the metal parts may, for example, be made of nickel clad steel. Also in lieu of nickel coating the several parts, the parts may, if desired, be made of nickel. After the shells and electrode assemblies have been provided with a coating of nickel or constructed of nickel, they are preferably polished with stainless steel brushes prior to assembly of the electrode assemblies in the shells. We have discovered that by so providing the surfaces of the several parts with which the mercury may come into contact with a nickel coating or making these parts of nickel that the capacity is considerably increased due to reduction of the temperature rise of the switch in operation. For example, in switches of the character above described designed for operation at 125 volts at 60 cycles alternating current and having a capacity of 10 amperes in which the surfaces of the shell and of the electrode assembly which may be contacted by the mercury of one switch had a nickel coating as compared with an identical switch not so coated, the temperature rise of the coated switch was about 30° F. and the uncoated switch about 80° F. In addition the nickel coating or nickel parts prevent contamination of the mercury and the burning thereof through to the steel of the nickel coated parts. Further, the nickel external surfaces of the parts of the switches prevents rusting and in this manner increases the life of the switches.

In the forms of the switches and the relay above described, the metal shells 6 and 6' and 33, the electrodes 12, 12' and 12'', and electrode members 38 and 40 are preferably made of 8—10, 10—10, or 10—12 cold rolled steel. The insulators 9, 9' and 35 are preferably made of dense steatite materials, chiefly clinoenstatite crystals ($MgO$—$SiO_2$). The glass seals 21 and 44 preferably are of a common boro silica type glass having a fusing temperature of about 1800° F. This type of glass is classified as a soft glass and requires no annealing after having been fused. The several compositions noted for the several parts of the switch and relay all have substantially matching thermal expansion characteristics over a temperature range to which the devices may be heated in the operation of the same so that the electrode assemblies when assembled in the manner described prevent breaking of the parts away from each other due to heat developed in the operation of the devices. It will be understood that materials other than those given above may be used, if desired. Also as previously noted, the parts when made of steel are preferably nickel coated, or if desired, the several parts may be made of nickel.

Preferably in the assembly of the switches or of the relay described the switch shells 6 and 6' or the relay shell 33' are supported in a nest of a welding electrode with its axis extending vertically and its open end disposed upwardly. A second welding electrode is movably arranged with respect to the first welding electrode to form a gas tight chamber with the first welding electrode and in which chamber the open end of the switch or relay shell is disposed. The electrode assembly for the switch or relays is loosely fitted into the open end of the switch or relay shell and is also contained within the chamber formed by the welding electrode. The uppermost welding electrode is in electrical contact with the annular shoulder 20 of the electrode assemblies for the mercury switches of Figures 1 to 4, or with the peripheral portion of the flange 45 of the electrode assembly for the relay 32. It will be understood that suitable gaskets are provided between the welding electrodes so that they are in gas tight relation with respect to each other with the switch or relay shell and electrode assembly therefor disposed in the chamber formed by the welding electrodes. A conduit or pipe is connected to the chamber between the welding electrodes with the conduit or pipe having connection with a suitable vacuum pump so that the chamber and the switch or relay shell may be evacuated. After evacuation of the shell the welding electrodes are energized for welding the annular flange 20 of the electrode assemblies of the switch or of the annular flange 45 of the relay 32 to the end edge of the open end of the shell for the switch or relay. If desired, the conduit or pipe extending to the chamber between the welding electrodes may be provided with a suitable valve for controlling the flow of gas, such as hydrogen, to the chamber to change the shell or casing therein after evacuation of the same with gas and prior to welding of the electrode assembly to the shell or casing to provide a gas filled switch or relay, as desired. Upon completion of the welding of an electrode assembly in the switch or relay shell therefor, the welding electrodes are separated and the switch or relay removed.

While we have shown what we consider to be the preferred embodiments of our invention, it

We claim:

1. An electrode assembly adapted to be mounted as a unit within the outer metal shell of a mercury switch or relay comprising a hollow ceramic insulator member having a portion for retaining a body of mercury, an electrode having a portion disposed in said mercury retaining portion of said ceramic insulator member, a metal sleeve mounted to said ceramic insulator and insertable concentrically within said shell for rigid connection therewith, and insulating material fused to said ceramic member, said electrode, and said sleeve and insulating said electrode from said sleeve.

2. An electrode assembly adapted to be inserted as a unit in the open end of an outer metal shell of a mercury switch comprising a ceramic member having a mercury retaining bore extending inwardly of one end thereof and having an annular shoulder co-axial of said bore, a metal sleeve of a diameter fitting about the annular shoulder of said ceramic member and extending endwise of said one end thereof co-axially of said bore with said sleeve being adapted for concentric reception within said switch shell and having rigid sealed connection therewith when said assembly is mounted therein, an electrode having a portion fitting in said bore and a portion extending axially of said sleeve out of contact therewith, and a seal of fused insulating material between said sleeve and said electrode fused thereto and to the portion of the surface of said one end of said ceramic member between the bore and the shoulder thereof.

3. An electrode assembly for insertion as an integral unit in the open end of an outer metal shell of a mercury to mercury switch comprising a ceramic member having a mercury retaining bore extending inwardly of one end thereof and an annular shoulder coaxial of said bore, a metal sleeve of a diameter fitting about the annular shoulder of said ceramic member and extending endwise of said one end thereof co-axially of said bore, said sleeve being adapted for insertion within said shell to which it is rigidly joined in the mounting of said assembly therewith, an electrode having a disc shaped portion fitting in said bore and a shank portion extending axially through said sleeve out of contact therewith, and a seal of fused insulating material between said sleeve and said electrode fused thereto and to the portion of the end surface of said one end of said ceramic member between the bore and the shoulder thereof.

4. An electrode assembly for insertion as an integral unit in the open end of an outer metal shell of a mercury to mercury switch comprising a ceramic member having a mercury retaining bore extending inwardly of one end thereof and an annular shoulder coaxial of said bore, a metal sleeve of a diameter fitting about the annular shoulder of said ceramic member and extending endwise of said one end thereof co-axially of said bore, said metal sleeve having a flange at the end thereof opposite said ceramic member for sealing connection with said shell in mounting assembly therein, an electrode having a portion fitting in said bore and a portion extending axially through said sleeve out of contact therewith, and a seal of fused insulating material between said sleeve and said electrode fused thereto and to the portion of the surface of said one end of said ceramic member between the bore and the shoulder thereof.

5. A mercury to mercury switch comprising a tubular metal shell open at one end, an electrode assembly insertable as an integral unit in said open end of said shell, comprising a ceramic member having a mercury retaining bore extending inwardly of one end thereof and an annular shoulder coaxial of said bore, a metal sleeve of a diameter fitting about the annular shoulder of said ceramic member and extending endwise of said one end thereof coaxially of said bore, an electrode having a portion fitting in said bore and a portion extending axially through said sleeve out of contact therewith, a seal of fused insulating material between said sleeve and said electrode fused thereto and to the portion of the surface of said one end of said ceramic member between the bore and the shoulder thereof, and said metal sleeve having an annular shoulder adapted to be welded to the outer edge of the open end of the metal shell to support the electrode assembly in the open end thereof with the bore of said ceramic member, said sleeve and said shank portion of said electrode means extending coaxially of the axis of said metal shell.

6. A mercury to mercury switch comprising a tubular metal shell of substantially uniform diameter and open at one end, an electrode assembly insertable as an integral unit in said open end of said shell, comprising a ceramic member having a mercury retaining bore extending inwardly of one end thereof and an annular shoulder coaxial with said bore of a diameter to be disposed within said tubular shell, a metal sleeve of a diameter fitting about the annular shoulder of said ceramic member and within said tubular shell and extending endwise of said one end of said ceramic member coaxially of said bore, an electrode having a portion fitting in said bore and a portion extending axially through said sleeve out of contact therewith, a seal of insulating material between said sleeve and said electrode fused thereto and to the portion of the surface of said one end of said ceramic member between the bore and the shoulder thereof, and said sleeve having an annular flange welded to the edge of the open end of said tubular shell.

7. An electrode assembly for a relay comprising a ceramic member having a recess at one end thereof for retaining a body of mercury and having a substantially frusto-conical peripheral surface adjacent its other end, a metal sleeve having a frusto-conical portion corresponding to the frusto-conical peripheral surface of said other end of said ceramic member and fitting thereon, an electrode extending through said frusto-conical portion of said sleeve in spaced relation thereto and said ceramic member into the recess of the latter, said sleeve having a cylindrical flange surrounding the frusto-conical portion thereof for welding connection with an outer metal shell of said relay, and a seal of fused insulating material between said frusto-conical portion of said sleeve and said electrode fused thereto and to the portion of the end surface of said other end of said ceramic member between said sleeve and said electrode.

8. An electrode assembly for insertion as an integral unit in an open end of an outer metal shell of a mercury switch, comprising a ceramic member having a mercury retaining bore, a metal sleeve mounted on said ceramic member and insertable in said shell to provide means for sealing said shell and electrode assembly together, an electrode having a cup-shaped portion fitting in said bore and a shank portion extending coaxially of said sleeve and out of contact therewith, and a seal of fused insulating material between said sleeve and said electrode fused thereto and to said ceramic member at the portion thereof between said electrode and said sleeve.

9. An electrode assembly for insertion as an integral unit in an open end of an outer metal shell of a mercury switch of the class described comprising a ceramic insulating member distinguished by an axial bore having an enlarged mercury retaining portion formed coaxially therewith, a sleeve member mountable about one end of said ceramic member and extending outwardly therefrom, said sleeve being insertable in said shell and having a sealed connection therewith when said assembly is mounted in said shell, an electrode insertable in said bore inwardly and in juxtaposition with said sleeve, but having no contact therewith, said electrode having an enlarged end portion which serves to form the bottom of a mercury retaining cup formed with said mercury retaining portion of said ceramic member and additionally serving as the bottom closure for a seal receiving cup formed with said ceramic and said sleeve; and a seal of fused glass material adapted to be poured into said seal receiving cup while in a molten state thereby to seal said electrode, ceramic and sleeve together as a unit along their interfacing surfaces forming the interior of said sealing cup.

10. An electrode assembly for use in a device of the class described and adapted to be mounted as an integral unit within an outer protective shell, comprising a ceramic insulating member having a central axial bore, a sleeve member adapted to surround one end of said ceramic member and project outwardly therefrom, said sleeve concentrically fitting within said shell and having rigid sealed connection therewith when said assembly is mounted in said shell, an electrode adapted to be received in and seal over one end of said bore adjacent said sleeve thereby forming a mercury retaining cup internally of said ceramic and a seal receiving cup, in conjunction with said sleeve, externally of said ceramic, and a seal of fused glass adapted to fill said seal receiving cup and fuse said electrode, ceramic and sleeve together along their interfacing surfaces which define the interior of said seal receiving cup.

HERBERT E. BUCKLEN, III.
GLEN L. WEIMER.

REFERENCES CITED

The following references are of record in the file of this patent:

UNITED STATES PATENTS

| Number | Name | Date |
|---|---|---|
| 1,762,213 | Callahan | June 10, 1930 |
| 2,087,738 | Ruth | July 20, 1937 |
| 2,125,316 | Ronci | Aug. 2, 1938 |
| 2,219,496 | Staley | Oct. 29, 1940 |
| 2,227,040 | Staley | Dec. 31, 1940 |
| 2,269,690 | Rickmeyer | Jan. 13, 1942 |
| 2,417,764 | Larson | Mar. 18, 1947 |